United States Patent
Enderton

(10) Patent No.: US 8,959,078 B1
(45) Date of Patent: *Feb. 17, 2015

(54) IDENTIFYING MISSING SEARCH PHRASES

(71) Applicant: A9.com, Inc., Palo Alto, CA (US)

(72) Inventor: Herbert D. Enderton, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,221

(22) Filed: Jun. 10, 2013

Related U.S. Application Data

(63) Continuation of application No. 12/560,983, filed on Sep. 16, 2009, now Pat. No. 8,463,769.

(51) Int. Cl.
*G06F 7/00* (2006.01)
*G06F 17/30* (2006.01)

(52) U.S. Cl.
CPC ............................ *G06F 17/30864* (2013.01)
USPC ............ 707/713; 707/736; 707/737; 707/748

(58) Field of Classification Search
CPC .................. G06F 17/30011; G06F 17/30029; G06F 17/30038; G06F 17/30864; G06F 17/30867; G06F 17/30702; G06F 17/30616
USPC .............. 707/713, 736, 737, 748, 808, 999.1, 707/999.3
See application file for complete search history.

(56) References Cited

U.S. PATENT DOCUMENTS

| | | | |
|---|---|---|---|
| 6,065,001 A | 5/2000 | Ohkubo et al. | |
| 6,963,867 B2 | 11/2005 | Ford et al. | |
| 7,412,442 B1 * | 8/2008 | Vadon et al. | 707/999.1 |
| 7,574,426 B1 | 8/2009 | Ortega | |
| 7,844,589 B2 | 11/2010 | Wang et al. | |
| 7,921,119 B2 | 4/2011 | Bowman et al. | |
| 7,996,393 B1 | 8/2011 | Nanno et al. | |
| 8,041,729 B2 | 10/2011 | Vandelle et al. | |
| 8,463,769 B1 | 6/2013 | Enderton | |
| 2003/0233224 A1 | 12/2003 | Marchisio et al. | |
| 2005/0108210 A1 * | 5/2005 | Wang et al. | 707/3 |
| 2005/0222987 A1 | 10/2005 | Vadon | |
| 2006/0129531 A1 | 6/2006 | Bates | |
| 2008/0004989 A1 | 1/2008 | Yi | |
| 2009/0204588 A1 * | 8/2009 | Hosono et al. | 707/3 |

OTHER PUBLICATIONS

Vadon, Eric R., "Detection of Behavior-Based Associations Between Search Strings and Items," U.S. Appl. No. 11/276,076, filed Feb. 13, 2006.
Bilenko, Mikhail; White, Ryen W., "Mining the Search Trails of Surfing Crowds: Identifying Relevant Websites From User Activity," World Wide Web Conference Committee, Apr. 21-25, 2008, Beijing, China, 10 pages.

(Continued)

*Primary Examiner* — Hares Jami
(74) *Attorney, Agent, or Firm* — Thomas | Horstemeyer, LLP

(57) ABSTRACT

In various embodiments, approaches for identifying missing search phrases are described. Search terms are behaviorally associated with an item in the electronic repository. If a search of the electronic repository fails to surface the item, the at least one search term can be identified as a missing search phrase for the item.

14 Claims, 3 Drawing Sheets

(56) References Cited

OTHER PUBLICATIONS

White; Ryen W., Belenko, Mikhail; Cucerzan, Silviu, "Studying the Use of Popular Destinations to Enhance Web Search Interaction," SIGIR 2007 Proceedings, Jul. 23-27, 2007, pp. 159-166.

Agichtein, Eugene, Brill, Eric, Dumais, Susan, "Improving Web Search Ranking by Incorporating User Behavior Information," SIGIR 2006, Aug. 6-11, 2006, 8 pages.

Radlinski, Filip, Joachims, Thorsten, "Query Chains: Learning to Rank from Implicit Feedback," KDD, Aug. 21-24, 2005, 10 pages.

White, Ryen W., Bilenko, Mikhail, Cucerzan, Siviu, "Leveraging Popular Destinations to Enhance Web Search Interaction," ACM Transactions on the Web, vol. 2, No. 3, Article 16, Publication Jul. 2008, 30 pages.

* cited by examiner

IDENTIFYING MISSING SEARCH PHRASES

CROSS-REFERENCE TO RELATED APPLICATION

This application is a continuation of and claims priority to U.S. application Ser. No. 12/560,983, entitled "Identifying Missing Search Phrases," filed Sep. 16, 2009, which is also incorporated by reference herein in its entirety.

BACKGROUND

Search engines can be employed in various settings, including in a general purpose setting or an electronic commerce system. Various items in an electronic repository can be surfaced by a search engine. However, some search terms or phrases may be attempted by users which do not locate or surface an item they are seeking. Additionally, some search terms or phrases may fail to cause an item that a user is seeking to rank appropriately high enough in a ranked list of search results.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
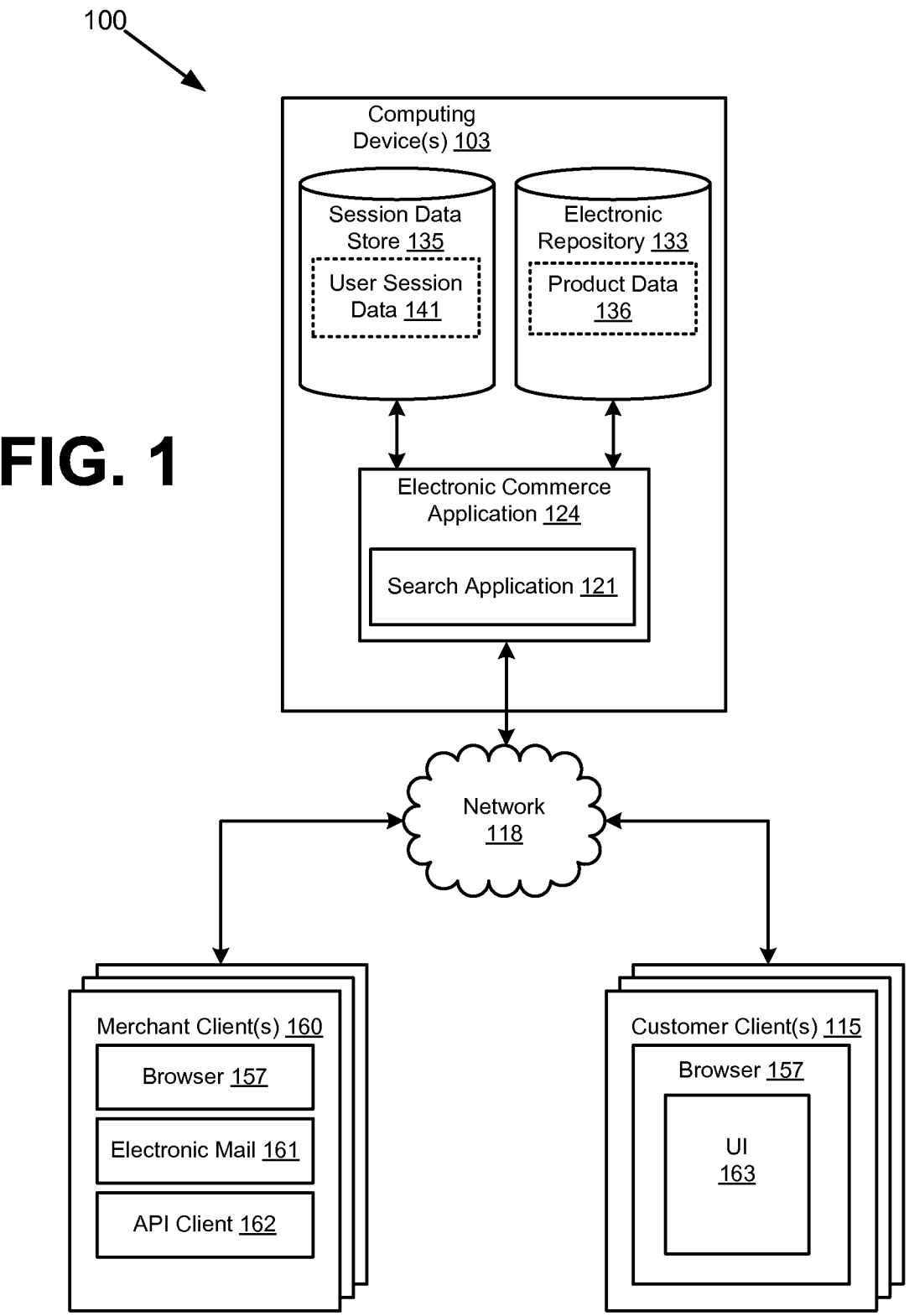
FIG. 1 is a drawing of a networked environment including a computing device executing a search application according to an embodiment of the present disclosure.

The various embodiments described herein relate to identifying search terms or search phrases that are employed by users to locate one or more items in an electronic repository. Users of an electronic repository, whether in the context of an electronic commerce system, a general purpose search engine, or other system, may attempt to use search terms or search phrases to locate or "surface" an item in the electronic repository. However, search terms submitted by a user to a search engine, electronic commerce application or other system may fail to locate items that the user seeks in an electronic repository. As a non-limiting example, a user may submit one or more search terms in an attempt to locate a product in an electronic commerce system. However, the electronic commerce system may be unable to locate the product desired by the user via a conventional search based upon the search terms (e.g., a search that employs word matching of the search terms and text located in data fields associated with the product). As a result, the electronic commerce system may fail to display the desired product to the user. Such a failure can manifest itself if the submitted search terms do not appear in product data that is associated with the product in the electronic repository.

For example, product data that is associated with a product in an electronic repository can include keywords, description, meta data, or other text that a search engine can index and/or query against when a user initiates a search of the repository. As an example of a user submitted search that may fail to surface a product that a user is seeking in an electronic commerce system, the user may search for the term "electric" when searching for a ceramic heater, but the product data available in the electronic repository associated with one or more ceramic heaters the user is seeking may fail to include the word "electric" in the associated product data. Accordingly, the user may be forced to attempt additional search terms or find the product through alternative avenues, which may impair the user experience.

Additionally, because search engines often rank search results that are returned to a user, search terms submitted by a user may result in a ranked list of search results that has not appropriately ranked items according to the expectation of the user. As one non-limiting example, upon submission of search terms intended to locate one or more items in an electronic repository, the search results may display the item sought by a user below or outside the initial search results, which may cause a less than optimal user experience. Accordingly, a user may be forced to attempt to submit additional search terms, or browse through numerous search results before arriving at an item in the electronic repository that matches the intentions of the user when the user submitted the search terms.

Accordingly, embodiments described herein can track a session corresponding to a user in order to identify search terms or search phrases that are potentially missing search terms, keywords, or search phrases that can be associated with one or more items in the electronic repository. In the case of an electronic commerce system, the items in the electronic repository can correspond to products available for purchase in the electronic commerce system. Therefore, embodiments described herein can, in one example, identify search terms submitted by a user and determine whether they could be associated with a product in the electronic commerce system by detecting whether a search engine or search application does not surface a particular item that the user eventually purchases within the same session. In other words, search terms can be behaviorally associated with items in the electronic repository if the behavior of a user while interacting with a system (e.g., a search engine, electronic commerce system, etc.) illustrates an association between user submitted search terms and an item.

In one example, embodiments of the disclosure can determine whether search terms are behaviorally associated with an item in an electronic repository by tracking user behavior within a user session. In the above non-limiting example, user submitted search terms can be behaviorally associated with an item that the user eventually purchases within a session. Such a behavioral association can be detected if a search of the electronic repository using the user submitted search terms does not directly surface the item that the user eventually purchases. Alternatively, user submitted search terms can be behaviorally associated with the item that a user eventually purchases if a search of the electronic repository using the user submitted search terms ranks the item in a list of search results lower than a predefined threshold. Embodiments of the disclosure can associate other user behavior with such a behavioral association including, but not limited to, a user viewing an item, adding an item to a shopping cart, or other user behavior.

Accordingly, if search terms submitted by a user are behaviorally associated with an item in the electronic repository, embodiments described herein can calculate a weight value representing a degree of association between the search term and an item in the electronic repository. Such a weight value and behavioral association can be calculated according to systems and methods disclosed in U.S. patent application Ser. No. 11/276,079 entitled "Detection of Behavior-Based Associations Between Search Strings and Terms," filed Feb. 13, 2006 (hereinafter, "Vadon"), which is incorporated herein by reference in its entirety. Weight values according to embodiments of the disclosure can be calculated on an aggregate basis, taking into account user sessions of multiple users of a system. Accordingly, weight values calculated on an aggregate basis can yield more accurate associations between search terms and items in an electronic repository, as such calculations take into account the behaviors of a larger number of users.

If a calculated weight value representing a degree of association between at least one search term and an item in an electronic repository exceeds a threshold, the user submitted search term(s) can be identified by embodiments of the disclosure as potentially missing search phrases for the item for which a behavioral association exists. In other words, if a user submitted search term fails to directly surface an item or fails to highly rank an item consistent with the expectations of a user, the search term can be identified as potentially missing keywords for the item. A threshold can be chosen to tune the sensitivity of the detection of potential missing keywords. Accordingly, a threshold can be raised to a higher calculated weight value (e.g., representing a greater degree of association) such that only associations between items and search terms that are closely related in a behavioral sense are identified as potential missing keywords. Alternatively, the threshold can be lowered to a lower calculated weight value (e.g., representing a lesser degree of association) so that more potential missing keywords are identified.

Accordingly, as potential missing keywords can be identified based upon a degree of behavioral association between search terms and items in an electronic repository, embodiments described herein can then initiate remedial measures that specify actions that can be taken in response to detection of potential missing keywords. As one non-limiting example, in the case of an electronic commerce system, the potential missing search phrase(s) identified by embodiments of the disclosure can be inserted and/or appended into product data associated with products in the electronic repository. Additionally, the potential missing search phrase(s) can also be incorporated into product data of similar products or other products within the same product category. Alternatively, potential missing search phrase(s) identified by embodiments of the disclosure can be transmitted to merchants selling items in an electronic commerce system so that a merchant can be made aware of potential missing search phrase(s) and view data regarding user behavior associated with the use of such phrases. In response, a merchant can update product data associated with a product listing in the electronic repository or take other remedial measures as deemed necessary.

Accordingly, with reference to FIG. 1, shown is a networked environment 100 according to various embodiments of the disclosure. The networked environment 100 includes a computing device 103 implementing an electronic commerce system. While the depicted example shows an embodiment of the disclosure in the context of an electronic commerce system, it should be appreciated that alternative embodiments of the disclosure can be implemented in the context of a general search engine or other types of applications in which an electronic repository 133 that a user may search is employed. The computing device 103 is in data communication with one or more customer clients 115 by way of a network 118. The network 118 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a workstation, a desktop computer, a server computer or like system. The computing device 103 may represent multiple computing devices, servers, etc., that are arranged, for example, in one or more banks, clusters or other arrangements. The computing device 103 may be located in a single installation or may be dispersed among many different geographical locations. As a non-limiting example, data stores depicted within the computing device 103 may be implemented in a first installation while one or more of the remaining logical components of the computing device 103 may be implemented in a second installation, with the two installations in data communication with one another. For purposes of convenience, the computing device 103 is referred to herein in the singular. However, in one embodiment, the computing device 103 can represent a plurality of computing devices 103 arranged as described above.

The computing device 103 is configured to execute various applications such as, for example, a search application 121, an electronic commerce application 124, and other applications. The search application 121 is executed to collect and process information relating to user submitted queries regarding related products, product categories, and/or other data accessible to the computing device 103. In other words, the search application 121 facilitates location of items on behalf of a user submitting search terms and/or search phrases to the computing device 103. To this end, the electronic commerce application 124 may include network page server functionality, such as a hypertext transfer protocol (HTTP) server. Alternatively, the electronic commerce application 124 may be in data communication with one or more distinct server or other applications. In some embodiments, the functionality of the search application 121 may be included in the electronic commerce application 124.

Also, the computing device 103 includes an electronic repository 133, which may comprise data and applications operable to provide access to the data stored therein. The electronic repository 133 may be used to store product data 136 and other data related to products in an electronic commerce system. Product data 136 comprises data regarding items offered for sale by one or more merchants. Product data 136 may include many fields of data regarding each item, such as, but not limited to, the following: product category, title, keywords, description, price, weight, shipping methods, related images, reviews, similar items, meta data, hidden text, a list of merchants selling the item, stock number, other associated categories, page view history, etc. The electronic repository 133 can also include other data related to products as can be appreciated, but are not necessary to discuss herein for an understanding of the various embodiments of the disclosure.

Accordingly, the search application 121 can receive search terms submitted by a user who is engaging in online shopping in the electronic commerce system. A user may submit search terms to the search application 121 in order to locate items and/or products in the electronic repository 133. The search application 121 can locate items corresponding to products in the electronic repository 133 on behalf of the user. As described herein, the search application 121 can also identify potential missing search phrases that have a behavioral association with items or products in the electronic repository 133.

The session data store 135 can store user session data 141, which contains tracking information about user sessions. As a non-limiting example, the user session data 141 can include information about user clicks (e.g., following a hyperlink generated by the electronic commerce application 124), user submitted search terms, items a user has viewed, purchased, added to a shopping cart, and other data regarding the activity of a user. The user session data 141 can be indexed or organized for a user session so that substantially all activity a user engages in during a visit to the electronic commerce system can be logged for analysis consistent with embodiments of the disclosure. As a non-limiting example, a user may be seeking to purchase a ceramic heater, so the user may submit search terms to the search application 121 in an effort to cause the search application 121 to locate a desired product. Accordingly, user session data 141 can store the search terms submitted by the user and any hyperlinks the user follows during the session.

The customer clients 115 may comprise, for example, a computer system such as a desktop, laptop, or other computer system. The customer clients 115 may also comprise personal digital assistants, cellular telephones, set-top boxes, or other systems with like capability. Further, the customer clients 115 may also comprise any device that is network capable that may communicate with the computing device 103 over the network 118 to perform various functions. Such customer clients 115 may comprise, for example, processor-based devices having processor circuits comprising a processor and a memory.

The customer clients 115 may be configured to execute various applications such as a browser 157 and/or other applications. The browser 157 may be executed in a customer client 115, for example, to access and render search result pages, network pages, such as web pages, or other network content served up by the computing device 103 and/or other servers. In other embodiments, the functionality performed by the customer client 115 and the computing device 103 may be performed in a single computer system such as, for example, a standalone kiosk.

The merchant clients 160 may comprise, for example, a computer system such as a desktop, laptop, or other computer system. The merchant clients 160, like the customer clients 115, may also comprise personal digital assistants, cellular telephones, set-top boxes, or other systems with like capability. Further, the merchant clients 115 may also comprise any device that is network capable that may communicate with the computing device 103 over the network 118 to perform various functions. Such merchant clients 115 may comprise, for example, processor-based devices having processor circuits comprising a processor and a memory.

The merchant clients 160 may be configured to execute various applications such as a browser 157 and/or other applications. The merchant clients 160 may also be configured to receive data from the computing device 103 via electronic mail 161, a special purpose application programming interface (API) client 162 configured to interact with an API, web service API, or other feed service provided by the computing device 103. The merchant clients 160 can be configured to receive data, alerts, notifications, etc. in a variety of formats from a variety of applications as can be appreciated.

Next, a general description of the operation of the various components of the networked environment 100 is provided. To begin, the search application 121 may facilitate locating items on behalf of users in the electronic repository 133. As noted above, a user can submit search terms to the search application 121 via the electronic commerce application 124. Accordingly, the search application 121 can attempt to locate items corresponding to products in the electronic repository 133. The search application 121 can perform a conventional search (e.g., word matching) for items in the electronic repository 133 by attempting to locate user submitted search terms in product data 136 that is associated with products available in an electronic commerce system.

As noted above, if a search employing the user submitted search terms conducted by search application 121 fails to directly surface an item the user is seeking or fails to return the item sought by a user appropriately ranked appropriately high in a list of search results, the search application 121 can determine whether a behavioral association exists between the search terms and an item in the electronic repository 133 by analyzing user session data 141 from the session data store 135.

As one non-limiting example, the search application 121 can determine whether user behavior corresponding to one or more users in the session data store 135 results in a behavioral association. If, for example, one or more users submit initial search terms that do not directly surface an item in the electronic repository 133, but the one or more users submit subsequent search terms that do directly surface an item corresponding to a product, the search application 121 can determine that a behavioral association exists between the item and the initial search terms.

Accordingly, in some embodiments, the search application 121 can calculate a weight value between the initial search terms and the item. If the calculated weight value exceeds a predefined threshold, the search application 121 can identify the association between the initial search terms and the item as a potential missing search phrase. As noted in Vadon, the weight value can vary based upon the activities undertaken by a user in relation to the item in the electronic repository 133. For example, if a user eventually purchases an item for which the search terms submitted by the user did not directly surface the item, a stronger behavioral association may be assumed and the calculated weight value increased. Accordingly, the search application 121 can be configured with a weight value threshold so that the search application 121 can only identify potential missing search phrases in circumstances where a weight value corresponding to a behavioral association exceeds a predefined threshold.

The search application 121, upon detection of a potential missing search phrase, can enact remedial measures to facilitate improving the user experience. As one non-limiting example, the search application 121 can append the potential missing search phrases it detects onto product data 136 associated with an item. The search application 121 can append the potential missing search phrases onto various data fields in the product data 136 (e.g., description, hidden text, meta data, etc.) so that the search application 121, in the future, will directly surface the item in response to a search conducted with the potential missing search phrases.

As an additional non-limiting example, the potential missing search phrase can include a common misspelling of a word associated with an item in the electronic repository 133. Additionally, in the context of an electronic commerce system, certain products that can be associated with items may employ coined terms and/or intentional misspellings in the product name, description, or other fields. Accordingly, a correctly spelled version of a word or phrase may fail to directly surface an item associated with a product a user is seeking. Accordingly, embodiments described herein can detect the above scenarios and enact remedial measures so that the search application 121 can surface a product that a user may be seeking even if a word-matching based search fails to surface the product.

The search application 121 can also modify its searching algorithms, search indexes, or take other search optimization techniques that should be appreciated in order to cause potential missing search phrases to surface items via the search application 121 for behavioral associations having a calculated weight value exceeding a threshold.

As an alternative non-limiting example, the search application 121 can transmit optimization data that includes information regarding the identified potential missing search phrase to a merchant client 160. The optimization data can include the missing search phrase and the item in the electronic repository 133 with which a behavioral association has been identified, which can allow a merchant to optimize items in the electronic repository 133 to be more responsive to user submitted search terms. In some embodiments, the search application 121 can require merchant intervention in order to enact remedial measures in response to a potential missing search phrase. The transmission of optimization data to a merchant client 160 and, in some embodiments, the requirement of merchant intervention in order to enact remedial measures can prevent remedial measures that cause the search application 121 to perform contrary to the desires of a merchant. As noted above, the optimization data can be transmitted to a merchant via a browser 157, electronic mail 161, an API client 162, or other alerts, feed service, etc. as can be appreciated.

Figure 2:
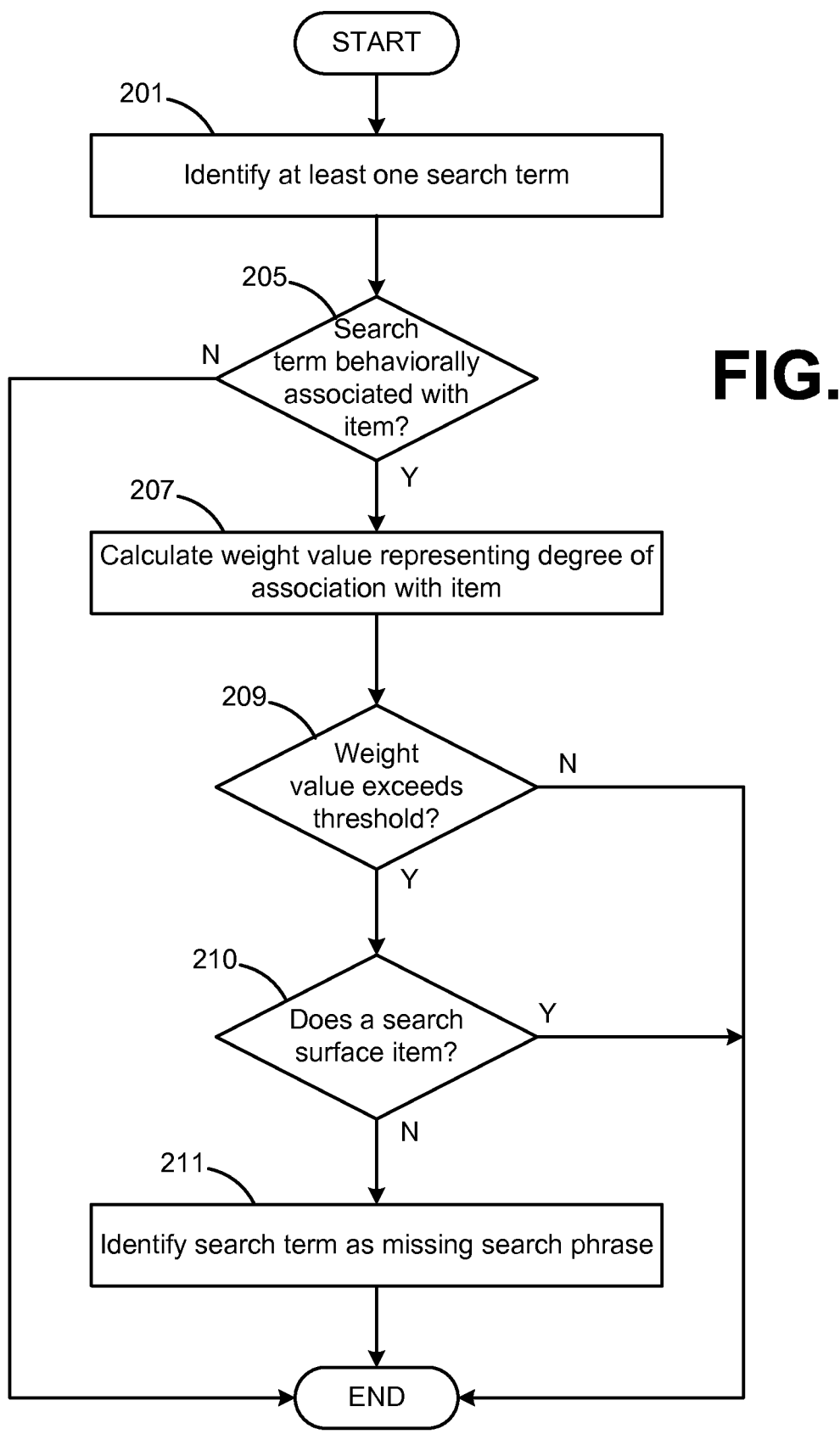
FIG. 2 is a drawing of a flowchart that illustrates one example of the operation of a search application executed in the computing device depicted in FIG. 1 according to an embodiment of the present disclosure.

Referring next to FIG. 2, shown is a flowchart that provides one example of the operation of the search application 121 (FIG. 1) according to an embodiment of the present disclosure. Alternatively, the flowchart of FIG. 2 may be viewed as depicting steps of an example method implemented in the computing device(s) 103 (FIG. 1) to identify a potential missing search phrase. The search application 121 acts upon user submitted search terms and analyzes an electronic repository 133 (FIG. 1) and user session data 141 (FIG. 1) as described above in order to identify potential missing search phrases.

Beginning with box 201, the search application 121 identifies at least one search term, which can take the form of a word, a coined term, or any assemblage of characters for which a search of an electronic repository 133 can be conducted. In one embodiment, a search term can comprise terms associated with a product in an electronic commerce system. The search application 121 can determine whether the search terms appear in data fields associated with an item in the electronic repository 133. In the case of an electronic commerce system, as described in reference to FIG. 1, the search application 121 can determine whether the search terms appear in product data 136 (FIG. 1) associated with a product in the electronic commerce system.

In box 205, the search application 121 determines whether a behavioral association exists between the user submitted search terms and the item sought by a user. As noted above as well as in Vadon, a behavioral association can be detected by analyzing user session data 141 of user sessions. Accordingly, if the search application 121 detects that one or more search terms are not behaviorally associated with an item, the search application 121 can terminate its iteration, because if no behavioral association exists, the search application 121 will not have to calculate a weight value representing the degree of behavioral association or enact remedial measures. If the search application 121 detects a behavioral association in box 205, the search application 121 proceeds to box 207, where a weight value is calculated.

As noted above, a weight value representing a degree of association between one or more user submitted search terms and an item in the electronic repository 133 can be calculated by the search application 121. According to embodiments described herein as well as in Vadon, a calculated weight value can be based on user session data 141 that reveals the activity of a user in relation to the item in the electronic repository 133. For example, if a user purchases a product for which a behavioral association exists, this activity can be weighted heavily, as a purchase decision can be deemed to represent a high degree of behavioral association. Likewise, if a user views an item and adds the item to a shopping cart, but does not purchase the item, this activity can be weighted less than a purchase decision. Additionally, if a user simply views an item but fails to either add the item to a shopping cart or purchase the item, this activity can be weighted to an even lesser degree when calculating a weight value.

Following box 207, the search application 121 can proceed to box 209, where it determines whether the calculated weight value exceeds a threshold. The threshold may be predefined when configuring the search application 121 and may be used to tune the sensitivity of the detection of potential missing search phrases by the search application 121. If the calculated weight value does not exceed the weight value threshold, the search application 121 can terminate, and potential missing search phrases are not identified if the weight value does not exceed the threshold. If the calculated weight value exceeds the threshold, the search application 121 can proceed to box 210, where it determines whether the search phrases directly surface an item in the electronic repository 133.

In other words, the search application 121 can determine whether the search terms are already associated with the item in the electronic repository 133. In one non-limiting example, the search application can perform a word matching search as well as determine whether an item sought by a user appears appropriately ranked in a list of ranked search results. In one example, the search application 121 can determine whether the item sought by a user is ranked lower than a predefined threshold in a list of ranked search results. By analyzing user session data 141 (FIG. 1), the search application 121 can determine from the session activity of a user whether search results returned by the search application 121 to the user meet with the expectations of a user. If, as in one non-limiting example, a user attempts another search with different search terms, follows multiple hyperlinks in a list of search results, or views multiple pages of search results before arriving on an item, the search application 121 can identify this behavior as indicative of a failure to directly surface an item sought by the user.

If the search application 121 directly surfaces the item the user is seeking in box 210, then the search application 121 can terminate its present iteration. If the search application 121 fails to directly surface the item or appropriately rank an item in a ranked list of search results, then the search application 121 can proceed to box 211, where it is determined that a potential missing search phrase exists for an item for which a behavioral association was identified.

As noted above, the search application 121, upon identification of potential missing search phrases for items in an electronic repository 133, can enact various remedial measures according to embodiments of the disclosure. The search application 121 can modify (in the case of an electronic commerce system) product data 136 associated with an item in the electronic repository 133 to include the missing search phrases. Additionally, the search application 121 can also notify a merchant and/or merchant client 160 (FIG. 1) of potential missing search phrases by transmitting optimization data to the merchant. The merchant clients 160 can be configured to receive data, alerts, notifications, etc. in a variety of formats from a variety of applications as can be appreciated. As noted above, merchant clients 160 may also be configured to receive data from the computing device 103 via electronic mail 161 (FIG. 1), a special purpose API client 162 (FIG. 1) configured to interact with an application programming interface (API), web service API, or other feed service provided by the computing device 103. The search application 121 can also modify search algorithms employed by the search application 121, or merely log the potential missing search phrases in a log or other location.

Figure 3:
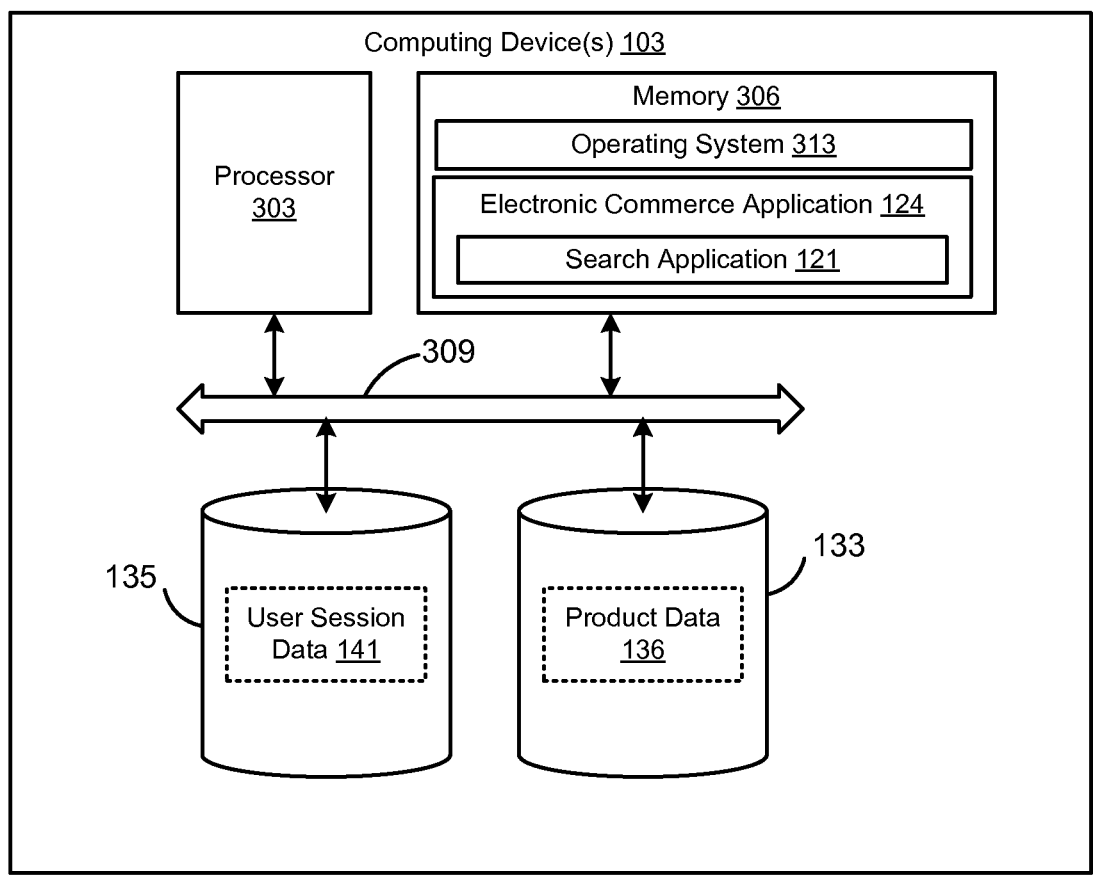
FIG. 3 is a drawing of a computing device used to implement the search application of FIG. 2 according to an embodiment of the present disclosure.

Referring next to FIG. 3, shown is an example of one embodiment of the one or more computing devices 103 according to various embodiments. The computing device 103 may include a processor circuit having a processor 303 and a memory 306, both of which are coupled to a local interface 309. The local interface 309 may comprise, for example, a data bus with an accompanying control/address bus as can be appreciated. To this end, each computing device 103 may comprise, for example, a computer system or other system with like capability. Such computer systems may be configured to optimally perform as servers as can be appreciated.

Various components may be stored in the memory 306 and are executable by the processor 303 including, for example, an operating system 313, the electronic commerce application 124, and the search application 121. In addition, other applications may be stored in the memory 306 and executable by the processor 303 as can be appreciated. The user session data 141 and product data 136 may be stored in a session data store 135 and electronic repository 133 that are accessible by the processor circuit of the computing device 103 so as to access the various data stored therein. Alternatively, the session data store 135 and electronic repository 133 may be stored in locations other than within the computing device 103.

The operating system 313, the electronic commerce application 124, and the search application 121 are described as being stored in the memory 306 and executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, or source code that may be expressed in proper format such as object code that is capable of being loaded into a of random access portion of the memory 306 and executed by the processor 303, etc. An executable program may be stored in any portion or component of the memory 306 including, for example, random access memory, read-only memory, a hard drive, compact disk (CD), floppy disk, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network 118 that facilitates communication between any two of the multiple processors 303, between any processor 303 and any one of the memories 306, or between any two of the memories 306 etc.

The functionality of the search application 121 as depicted by the example flowchart of FIG. 2 may be implemented, for example, in an object oriented design or in some other programming architecture. Assuming the functionality is implemented in an object oriented design, each block represents functionality that may be implemented in one or more methods that are encapsulated in one or more objects. The search application 121 may be implemented using any one of a number of programming languages such as, for example, C, C++, JAVA, or other programming languages.

With reference to FIGS. 1-3, although the search application 121 is described as being embodied in software or code executed by general purpose hardware above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of the search application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flow chart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the search application 121 comprises software or code, it can be embodied in any computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the search application 121 or electronic commerce application 124 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer readable medium embodying a computer program executable by a computing device, the program comprising:
    code that behaviorally associates at least one search term with an item from an electronic repository in a computing device by determining whether data regarding behavior of at least one user exhibits an association between the at least one search term and the item;
    code that calculates at least one weight value in the computing device representing a degree of behavioral association between the at least one search term and the item, the at least one weight value based at least upon the data regarding behavior of the at least one user;
    code that determines whether the at least one weight value exceeds a predefined threshold;
    code that determines whether a search of the electronic repository surfaces the item, the search configured to surface items based at least upon word matching between the at least one search term and at least one attribute associated with the item; and
    code that associates the at least one search term with the item in the electronic repository without user intervention when the search of the electronic repository fails to surface the item by associating the at least one search term to an attribute associated with the item in the electronic repository.

2. The non-transitory computer readable medium of claim 1, wherein the code that behaviorally associates the at least one search term with the item in the electronic repository further comprises determining whether the at least one user purchases the item from an electronic commerce system during at least one user session.

3. A method, comprising:
    behaviorally associating, via at least one computing device, at least one search term with an item in an electronic repository;
    calculating, via the at least one computing device, a plurality of weight values representing a degree of association between the at least one search term and the item;
    determining, via the at least one computing device, whether a search of the electronic repository surfaces the item;
    identifying, via the at least one computing device, the at least one search term as a missing search phrase in response to the search failing to surface the item; and
    adding, via the at least one computing device, the at least one search term to at least one attribute associated with the item in the electronic repository without user intervention in response to identification of the at least one search term as the missing search phrase.

4. The method of claim 3, wherein behaviorally associating the at least one search term with the item in the electronic repository further comprises determining whether a user submitting the at least one search term purchases the item from an electronic commerce system during a user session.

5. The method of claim 3, wherein behaviorally associating the at least one search term with the item in the electronic repository further comprises determining whether a user submitting the at least one search term activates a hyperlink corresponding to the item during a user session.

6. The method of claim 3, wherein determining whether the search of the electronic repository surfaces the item further comprises determining whether the at least one search term appears in at least one attribute associated with the item in the electronic repository.

7. The method of claim 3, wherein determining whether the search of the electronic repository surfaces the item further comprises performing a natural language search of the electronic repository with the at least one search term.

8. A system, comprising:
    at least one computing device; and
    a search application executed on the at least one computing device, the search application further comprising:
        logic that associates at least one search term with an item in an electronic repository based at least upon behavior of at least one user with respect to interactions of at least one user with the at least one computing device;
        logic that determines whether a search of the electronic repository surfaces the item;
        logic that identifies the at least one search term as a missing search phrase when the search using the at least one search term of the electronic repository fails to surface the item; and
        logic that adds the at least one search term to at least one attribute associated with the item in the electronic repository without user intervention in response to identification of the at least one search term as the missing search phrase.

9. The system of claim 8, wherein the behavior of the at least one user is extracted from a session data store configured to store tracking information about user sessions.

10. The system of claim 8, wherein the logic that determines whether the search of the electronic repository surfaces the item further comprises logic that determines whether the at least one search term appears in at least one attribute associated with the item in the electronic repository.

11. The system of claim 8, wherein the logic that determines whether the search of the electronic repository surfaces the item further comprises logic that performs a natural language search of the electronic repository with the at least one search term and determines whether the natural language search associates the at least one search term with the item.

12. The system of claim 8, further comprising logic that takes remedial measures if the search of the electronic repository does not associate the at least one search term with the item by associating the at least one search term with at least one attribute associated with at least one other item in the electronic repository.

13. The system of claim 12, wherein the at least one other item in the electronic repository is in a common category relative to the item.

14. The system of claim 8, further comprising logic that takes remedial measures if the search does not surface the item by transmitting optimization data to a merchant, the optimization data including the missing search phrase and information about the item in the electronic repository.

\* \* \* \* \*